United States Patent [19]
Pieloth et al.

[11] Patent Number: 5,653,422
[45] Date of Patent: Aug. 5, 1997

[54] SOLENOID VALVE

[75] Inventors: Manfred Pieloth, Dresden; Dieter Schrepel, Friedewald; Heinz Töpfer, Dresden, all of Germany

[73] Assignee: Burkert Werke GmbH & Co., Ingelfingen, Germany

[21] Appl. No.: 530,287

[22] PCT Filed: Feb. 21, 1995

[86] PCT No.: PCT/EP95/00619

§ 371 Date: Oct. 12, 1995

§ 102(e) Date: Oct. 12, 1995

[87] PCT Pub. No.: WO95/22709

PCT Pub. Date: Aug. 24, 1995

[30] Foreign Application Priority Data

Feb. 22, 1994 [DE] Germany .............. 44 05 657.5

[51] Int. Cl.$^6$ .............................. F16K 31/06; F16K 11/02
[52] U.S. Cl. .................... 251/129.2; 251/129.17; 251/331; 137/625.44
[58] Field of Search .................. 251/129.15, 129.16, 251/129.17, 129.2, 331; 137/625.44

[56] References Cited

U.S. PATENT DOCUMENTS

| | | | |
|---|---|---|---|
| 4,446,889 | 5/1984 | Sakakibara et al. | 251/129.16 X |
| 5,040,567 | 8/1991 | Nestler et al. | 251/129.16 X |
| 5,139,226 | 8/1992 | Baldwin et al. | 251/129.2 |
| 5,265,843 | 11/1993 | Kleinhappl | 251/129.17 |

*Primary Examiner*—Kevin Lee
*Attorney, Agent, or Firm*—Sixbey Friedman Leedom & Ferguson; Gerald J. Ferguson, Jr.; Thomas W. Cole

[57] ABSTRACT

The solenoid valve, which can be used as a single valve to control small flow quantities, or also as a pilot valve for valves controlling larger flow quantities of a medium, has a narrow, oblong cuboid valve housing (10), in which two seal seats (38, 40) and an oblong chamber (26) are formed. In this chamber (26) a bar-shaped armature (28) is movably accommodated and pivotally located on a blunt edge (30). The armature (28) has two recesses (42, 44) each opposite the seal seats (38, 40). A seal (46, 48) is located in each recess. The armature (28) is retained in its functional position by means of a return spring (50) stabilised in position on the floor of the chamber (26), the spring engaging in one recess (44) of the armature (28).

10 Claims, 2 Drawing Sheets

SOLENOID VALVE

The invention relates to a solenoid valve with an oblong cuboid valve housing, in which two seal seats and an oblong chamber are formed, with a bar-shaped armature which is accommodated in the chamber and is preloaded in one of two switching positions by means of a return spring, and with a solenoid unit which is joined to the valve housing on the side of the housing opposite the seal seats, with the armature having a blunt edge on the side facing the solenoid unit and being pivotally mounted.

A solenoid valve of this design is known from the German utility model specification 73 24 333. The armature of this solenoid valve is pivotally mounted on a lip. The return spring, which is designed as a simple spiral spring, engages one of the two ends of the armature and pushes said end away from the floor of the valve housing, with the neighbouring seal being lifted from its seal seat and the second seal being pressed against its seal seat at the opposite end of the armature. Both seals are integrated in a diaphragm, through which the valve chamber is separated from the chamber neighbouring the solenoid valve, in which chamber the armature is located.

This known solenoid valve is well suited to compact, narrow designs. There are, however, limits to further miniaturisation, since the lip mounting of the armature becomes problematic in small dimensions as far as installation and manufacturing tolerances are concerned.

Through the invention a solenoid valve is provided allowing further miniaturisation and very narrow designs, since it consists of few individual parts, which are easy to manufacture, and permits simple and if required automatic mounting as well as easy maintenance, since the need for adjustment work is obviated.

The solenoid valve in accordance with the invention is characterised by the armature being inserted movably in the chamber of the valve housing and being mounted with its blunt edge on an even supporting area without position stabilisation; the return spring engages in a recess in the armature on the side of the armature opposite the seal seat and is stabilised in position on the valve housing. The armature thus does not have a pivoted axis fixed in space, but is only supported with its blunt edge on the even supporting area; the position of the pivoted axis of the armature in the plane of the supporting area results without constrained action due to the equilibrium which occurs automatically between all involved supporting and frictional forces induced by the strength of the return spring.

To ensure that the armature does not move out of its functional position due to the effect of hard knocks, the armature is closely surrounded by the internal walls of the chamber of the valve housing, and only has enough distance from these to be able to move freely. Under the effects of knocks or vibrations, the internal walls of the chamber thus act as stop faces for the armature.

In the preferred embodiment, one of the two seals is also located in the recess in the armature; this works together with a seal seat opposite, which is located at the end of a nozzle projecting into the valve chamber. The return spring, which is designed as a simple spiral spring, encompasses the nozzle and is fixed in position by this on the floor of the valve chamber.

If necessary, a second seal is also located in a recess in the armature; this seal is located on the side facing away from the first seal opposite the appropriate seal seat, which is also formed at the end of a nozzle projecting into the valve chamber.

The solenoid valve is very suitable for advanced miniaturisation, since it consists of few individual parts. These are easy to manufacture due to their simple form. The armature is a drive element and an actuating element at the same time, and represents the only moving part. It carries the seals and is inserted movably, without fixed articulation or bearing, in the chamber of the valve housing. An unfavourable summation of manufacturing tolerances is also avoided through the small number of individual parts. To assemble the valve, only two parts, viz. armature and return spring, have to be inserted in the chamber of the valve housing; this procedure is also suitable for automation.

Finally, high valve switching speed is favoured by the simple design of the valve and the low mass of the only moving part, viz. the armature; at the same time, an extremely high number of switching cycles is achieved.

In an alternative design of the solenoid valve in accordance with the invention, the chamber in which the armature is located is separated from the adjacent valve chamber by means of a diaphragm. This design is characterised by a particularly small dead volume. The diaphragm has two integrally formed seals, each opposite the seal seats on the floor of the valve chamber. The seals are each actuated by means of a tappet, which at one end is flexibly mounted on the diaphragm and at the other end is flexibly mounted on the armature, preferably by means of a rubber part which is inserted in a recess in the armature and in which the end of the tappet is embedded.

Further features and advantages of the invention can be seen from the following description of several embodiments and from the drawing to which reference is made. In the drawing, FIG. 1 shows a schematic sectional view of a first embodiment of the solenoid valve;

Figure 1:
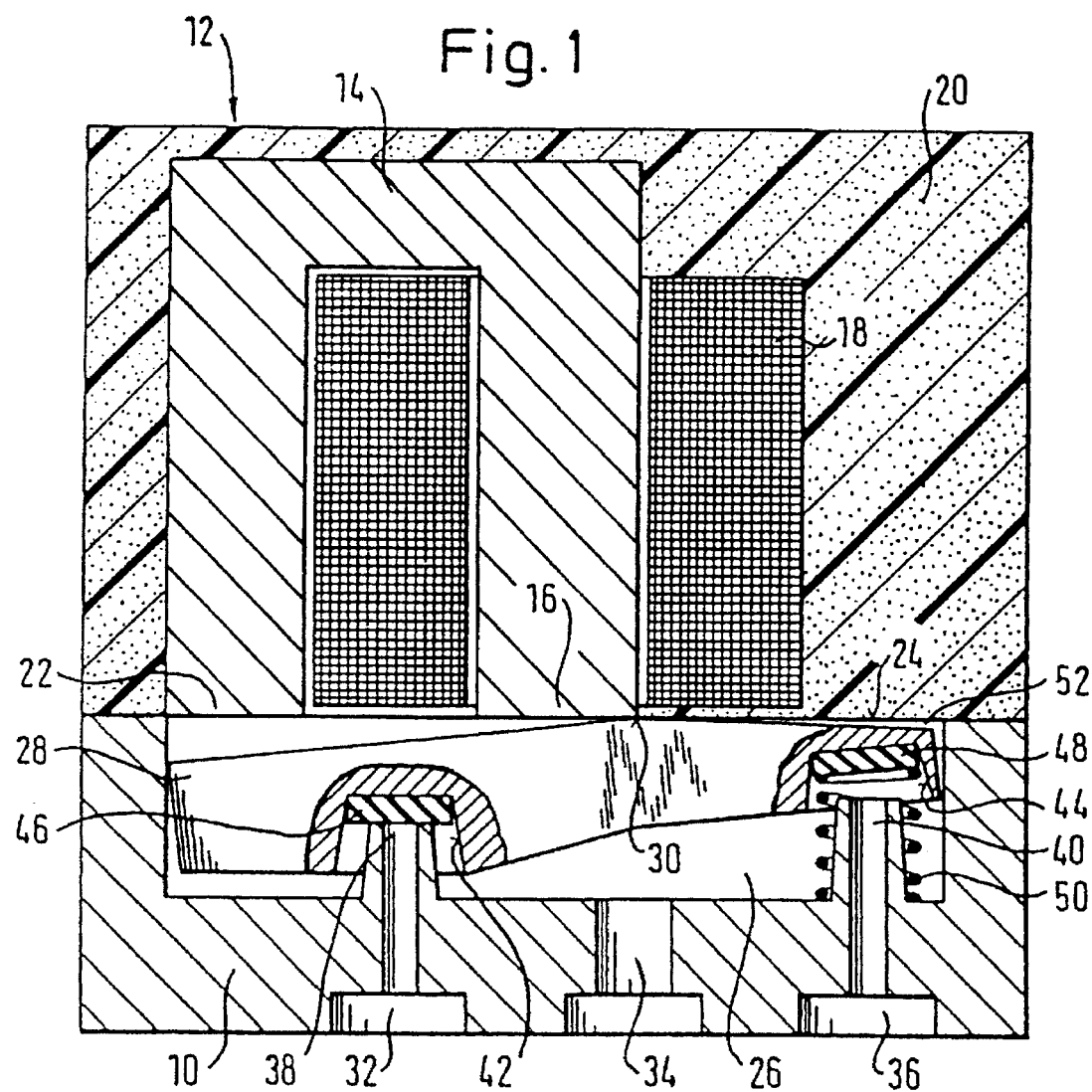
Figure 2:
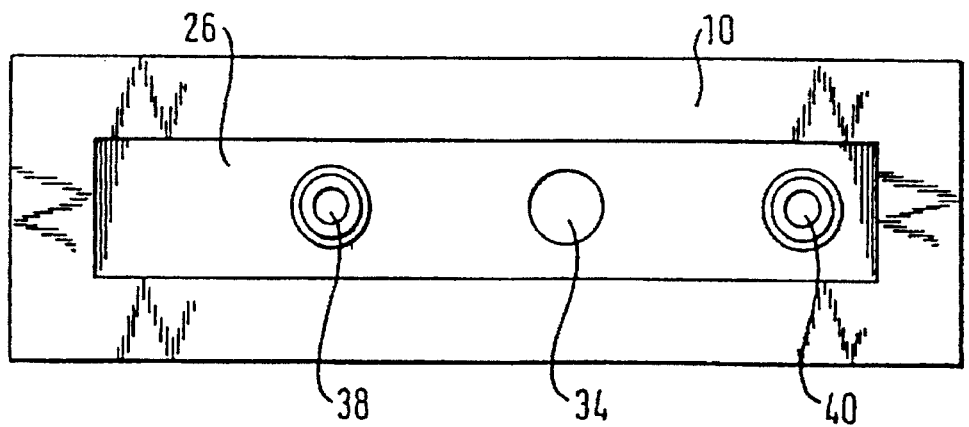
FIG. 2 shows a top view of the floor of the valve chamber of the solenoid valve.

The solenoid valve consists of two jointed assemblies, a valve housing 10 with the functional parts of the valve, and a solenoid unit 12, which is jointed to the open upper side of the valve housing 10 and which is tightly fitted to said valve housing 10. Valve housing 10 and solenoid unit 12, each individually and also together, form a narrow cuboid.

The solenoid unit 12 consists of a U-shaped magnet yoke 14 and a magnet coil 18 attached to one pole 16 of said magnet yoke 14. The magnet yoke 14 and the magnet coil 18 are embedded in a plastic block 20. The second pole 22 of the magnet yoke 14 is located at one outer end of the oblong, cuboid valve housing 10, and pole 16 is located approximately in the centre above the valve housing 10. The pole surfaces are aligned at the separating surface 24 between the valve housing 10 and the solenoid unit 12.

An oblong cuboid chamber 26 is formed in the interior of the valve housing 10. This chamber 26 accommodates a bar-shaped armature 28. This armature 28 has a blunt edge 30 on the side facing the solenoid unit 12, with which it is pivotally supported on the supporting surface formed by the separating surface 24. Three channels 32, 34 and 36 extend through the floor of the valve housing 10; of these, the outermost, 32 and 36, project into the interior of the chamber 26 with one nozzle each, 38 and 40. The armature 28 has two recesses, 42 and 44, on the opposite sides to these nozzles 38, 40 respectively. Disk-shaped seals 46, 48 made of an elastomeric material, e.g. rubber, are inserted in each of these recesses 42, 44. A spiral-shaped return spring 50 encompasses the nozzle 40 with one end on the floor of the chamber 26, and engages in the recess 44 of the armature 28 with the other end. The free ends of the nozzles 38, 40 each form a ring-shaped seal seat to engage with the seals 46 and 48 opposite.

The armature 28 is inserted movably and without position stabilisation in the chamber 26. It is surrounded by the internal walls of the chamber 26 with as little play as possible to be able to move freely. The internal walls of the chamber 26 thus act as stop faces for the armature 28, to ensure that said armature does not move out of its functional position due to the effect of hard knocks on the solenoid valve. The blunt edge 30 of the armature 28 automatically moves into an optimum position on the supporting area formed by the separating surface 24; this position is determined by the equilibrium of all involved supporting and frictional forces induced by the return spring 50. Through its transversal rigidity, the return spring 50 keeps the armature 28 in the desired functional position, in which the seals 46 and 48 are located approximately centrally above the respective seal seats. The exact position, however, is not critical. The return spring 50 pushes the appropriate limb of the armature 28 away from the floor of the chamber 26, and at the same time brings the seal 46 into contact with its seal seat. In this first switching status, shown in FIG. 1, the seal 48 is raised from the appropriate seal seat, so that a flow connection exists between channels 34 and 36 via the chamber 26. As can also be seen from FIG. 1, in this status a narrow wedge-shaped gap 52 remains between the armature 28 and the separating surface 24. This gap prevents the armature from sticking due to magnetic remanence or liquid residues.

When the solenoid unit 12 is activated by excitation the magnet coil 18, the limb of the armature 28 facing away from the return spring 50 is attracted to the poles 16, 22 of the magnet yoke 14. However, before large-area contact takes place, the seal 48 is pressed onto the appropriate seal seat, so that here too a narrow wedge-shaped gap, like the gap 52 in the other switching status, is formed to ensure that the armature does not stick.

The solenoid valve is very suitable for advanced miniaturisation, since it consists of few individual parts, which are easy to manufacture. To assemble the valve, only two individual parts, the armature 28 and the return spring 50, have to be inserted in the chamber 26. No adjustment whatsoever is required. The solenoid unit 12 can be welded or bonded to the valve housing 10. The resulting flat cuboid is also very suitable for setting up groups of valves lined up side by side.

The solenoid valve described can be used as a single valve to control small flow quantities, or also as a pilot valve for valves controlling larger flow quantities of a medium. Due to the low mass of its moving parts it allows high switching speed and a very high number of switching cycles.

Figure 3:
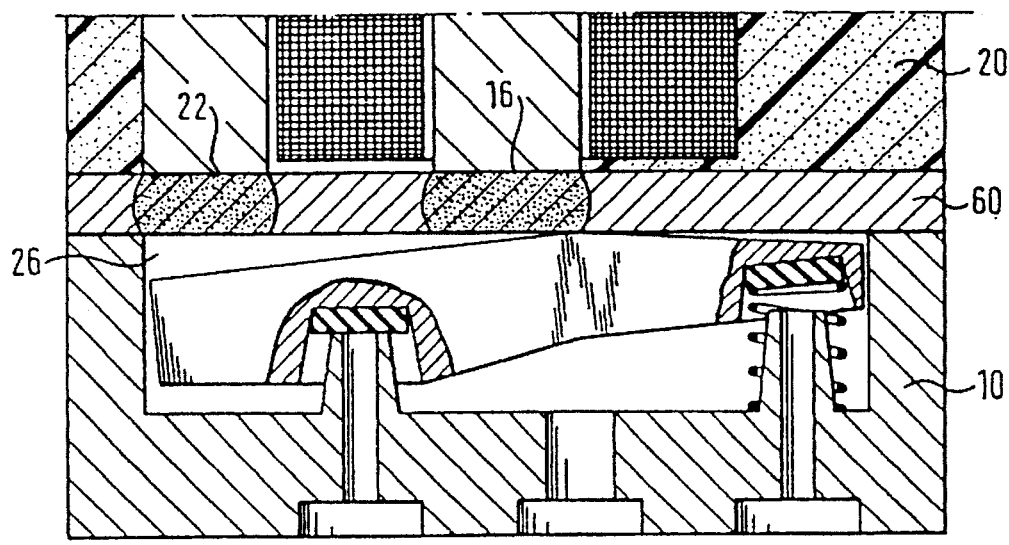
FIG. 3 shows a part sectional view of an embodiment variation of the solenoid valve.

In the variant shown in FIG. 3, a separating plate 60 is inserted between the valve housing 10 and the block 20 containing the solenoid unit 12. By means of the separating plate 60, which is tightly attached to the upper side of the valve housing 10, the chamber 26 is closed, so that if required the block 20 with the solenoid unit can be removed without opening the chamber 26. The separating plate 60 is magnetically conductive in the areas located opposite the poles 16 and 22, but is otherwise completely non-magnetic. This selective magnetic conductivity can be obtained by integrating magnetically conductive material such as iron in magnetically non-conductive material such as brass or plastic; it is also possible to fashion the separating plate 60 from a special ferrous alloy which can be made partially magnetically conductive.

In the design of the valve part, the embodiment variant in accordance with FIG. 3 does not differ from the embodiment described above.

Figure 4:
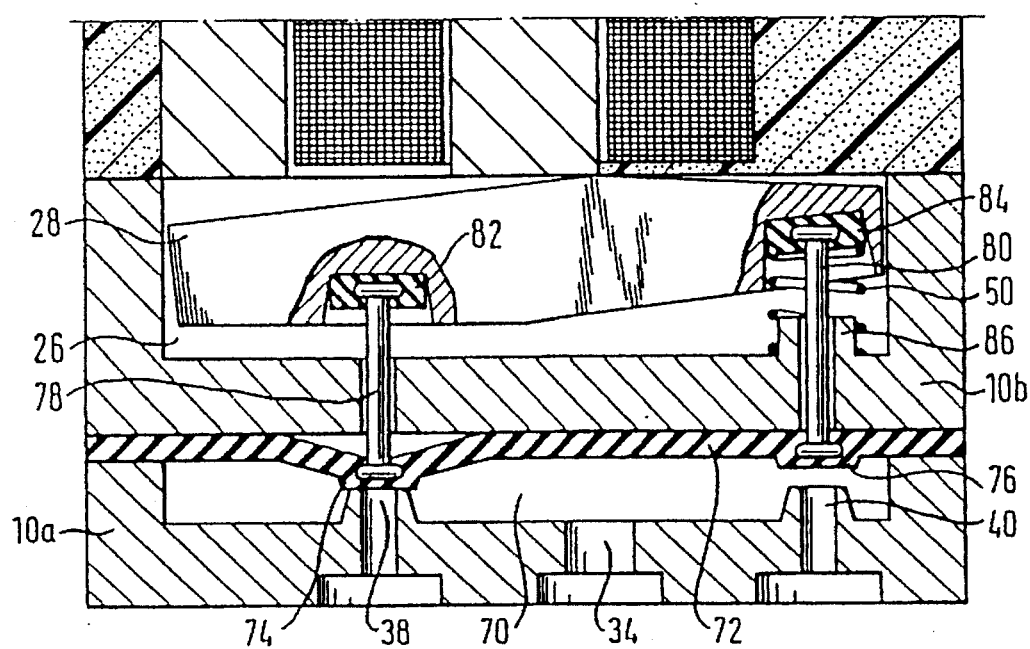
FIG. 4 shows a part sectional view of a second embodiment of the solenoid valve.

In the embodiment in accordance with FIG. 4, the chamber 26, in which the armature 28 is accommodated in the same way as in the embodiments described above, is arranged separate from a valve chamber 70. The valve chamber 70 is arranged in a separate, flat valve housing 10a, the floor area of which is largely identical to the embodiments described so far. Between the valve housing 10a and the intermediate housing 10b which forms the chamber 26, a diaphragm 72 is clamped in position at its outer edge. The diaphragm 72 is fitted with two integrally formed sealing elements, 74 and 76, opposite the respective ring-shaped seal seats which are located at the free ends of the nozzles 38 and 40 projecting into the valve chamber 70. Above each of these sealing elements 74, 76, one widened end piece each of actuating tappets 78 and 80 is flexibly connected to the diaphragm 72, for example by embedding or buttoning into the diaphragm 72, which consists of a material which is elastic like rubber. The actuating tappets 78, 80 project into the chamber 26 through suitable openings in the floor of the intermediate housing 10b, and are pivotally connected to the armature 28 with their respective ends. The articulation of the actuating tappets 78, 80 with the armature 28 is effected in each case by means of disk-shaped coupling elements 82 and 84, which are inserted in the appropriate recesses in the armature 28. The widened ends of the actuating tappets 78 and 80 are embedded or buttoned into the material, which is elastic like rubber, of the coupling elements 82 and 84. In this embodiment, the return spring 50 encompasses a ring collar 86, which projects into the chamber 26 from the floor of said chamber and elongates the opening through which the actuating tappet 80 extends.

In the embodiment shown in FIG. 4, the actuation of the sealing elements 74, 76, unlike the embodiments described so far, is not effected directly through the armature 28, but indirectly through the actuating tappets 78, 80. Since the armature 28 is located outside the valve chamber 70, the dead volume of the valve chamber can be very small. The arrangement and mounting of the armature 28 is identical with the embodiments described above and has the same advantages.

Figure 5A:
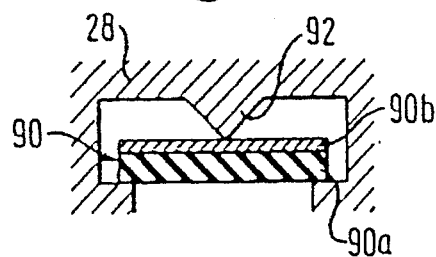
FIGS. 5a, 5b and 5c show various arrangements of a seal in the solenoid valve.
Figure 5B:
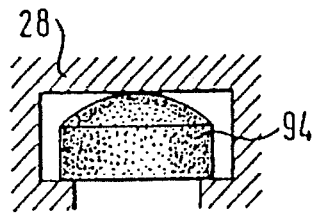
Figure 5C:
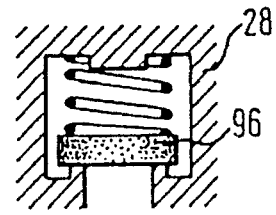

The FIGS. 5a, 5b and 5c show embodiment variants in which a sealing element is movably supported on the armature in different ways.

In FIG. 5a, a disk-shaped sealing element 90, consisting of a rigid disk 90b and an elastomer coating 90a bonded to said disk, is movably supported on a cone 92 on the floor of a recess in the armature 28. This support of the sealing element 90 resembles a toe bearing permitting a pivoting movement in all directions, so that the sealing element automatically comes into contact with the appropriate ring-shaped seal seat with even pressure distribution.

In FIG. 5b, a sealing element 94 with a dome-shaped back surface is mounted on the floor of the recess of the armature 28 so that it can pivot in all directions. Here too, the sealing element 94 is automatically aligned with the appropriate seal seat.

Finally, FIG. 5c shows a disk-shaped sealing element 96 which is supported on its rear side on the floor of the recess of the armature 28 by means of a spiral spring, and through this flexible support is in a position to achieve optimum alignment with the appropriate seal seat.

We claim:

1. A solenoid valve comprising an oblong valve housing, an oblong chamber formed in said housing, a pair of valve seats arranged in said housing and a bar-shaped armature accommodated in said chamber, said armature being preloaded in one of two switching positions by means of a return spring, and further comprising a solenoid unit which is joined to the valve housing on a side of the housing opposite said valve seats, said armature being loosely fitted into said chamber and having a blunt support edge and being pivotally mounted on a flat face adjacent said solenoid unit by means of said blunt edge which bears on said flat face, and said armature further carrying a pair of seal members for alternately closing and opening said valve seats on pivotal movement between said switching positions.

2. The solenoid valve of claim 1, wherein said return spring engages into a recess in said armature.

3. The solenoid valve of claim 2, wherein said return spring is a helical compression spring, one of said valve seats being formed on a sleeve projecting into said chamber, and said compression spring being engaged around said sleeve.

4. The solenoid spring of claim 1, wherein each valve seat is formed on one of two sleeves projecting into said chamber, and each of said seal members is accommodated in a corresponding recess of said armature.

5. The solenoid valve of claim 4, wherein each of said seal members is movably accommodated in the corresponding recess of said armature.

6. The solenoid valve of claim 1, wherein a separating plate is arranged between said solenoid unit and said valve housing, said flat face being formed on said separating plate.

7. The solenoid valve of claim 6, wherein said separating plate is magnetically conductive in areas located opposite poles of said solenoid unit, and being non-magnetic in remaining areas.

8. A solenoid valve comprising an oblong valve housing, an oblong chamber formed in said housing, a pair of valve seats arranged in said housing and a bar-shaped armature accommodated in said chamber, said armature being preloaded in one of two switching positions by means of a return spring, and further comprising a solenoid unit which is joined to the valve housing on a side of the housing opposite said valve seats, said armature being loosely fitted into said chamber and having a blunt support edge and being pivotally mounted on a flat face adjacent said solenoid unit by means of said blunt edge which bears on said flat face, and a pair of seal members being formed on a diaphragm which has a peripheral edge clamped between first and second parts of said housing, and said armature is connected to said diaphragm by a pair of tappets, each tappet having one end flexibly connected to said armature and another end connected to said diaphragm close to a corresponding one of said seal members.

9. The solenoid valve of claim 8, wherein said return spring engages into a recess in said armature.

10. The solenoid valve of claim 9, wherein said return spring is a helical compression spring, and said compression spring is engaged around a sleeve through which a corresponding one of said tappets extends.

* * * * *